United States Patent [19]

Kajita

[11] Patent Number: 4,954,913

[45] Date of Patent: Sep. 4, 1990

[54] IMAGE READING APPARATUS

[75] Inventor: Koji Kajita, Yokohama, Japan

[73] Assignee: Canon Kabushiki Kaisha, Tokyo, Japan

[21] Appl. No.: 299,451

[22] Filed: Jan. 23, 1989

[30] Foreign Application Priority Data

Jan. 29, 1988 [JP] Japan .................. 63-018809
May 20, 1988 [JP] Japan .................. 63-123680

[51] Int. Cl.$^5$ .............................................. H04N 1/04
[52] U.S. Cl. .................................... 358/474; 358/453; 358/451; 358/468
[58] Field of Search .............. 358/453, 451, 468, 474

[56] References Cited

U.S. PATENT DOCUMENTS

| | | | |
|---|---|---|---|
| 3,976,982 | 8/1976 | Eiselem | 358/453 |
| 4,282,550 | 8/1981 | Coviello | 358/453 |
| 4,580,171 | 4/1986 | Arimoto | 358/453 |
| 4,631,596 | 12/1986 | Yaguchi | 358/453 |
| 4,723,172 | 2/1988 | Matsumoto | 358/468 |

Primary Examiner—Edward L. Coles, Sr.
Attorney, Agent, or Firm—Fitzpatrick, Cella, Harper & Scinto

[57] ABSTRACT

An image reading apparatus providing boundary shading correction includes reading circuitry for reading an image line by line and outputting image data, a first moving device for repeatedly moving the reading position of the reading circuitry in a main scanning direction a plurality of times, and a second moving device for moving the reading position of the reading circuitry in a subscanning direction every time the reading position of the reading circuitry is moved in the main scanning direction. Detection circuitry is provided for detecting a difference between image data outputted from the reading circuitry during a preceding movement of the reading position in the main scanning direction and image data outputted from the reading circuitry during a current movement of the reading position in the main scanning direction. Finally, correction circuitry is provided for correcting the image data outputted from the reading circuitry based on the difference detected by the detection circuitry.

18 Claims, 14 Drawing Sheets

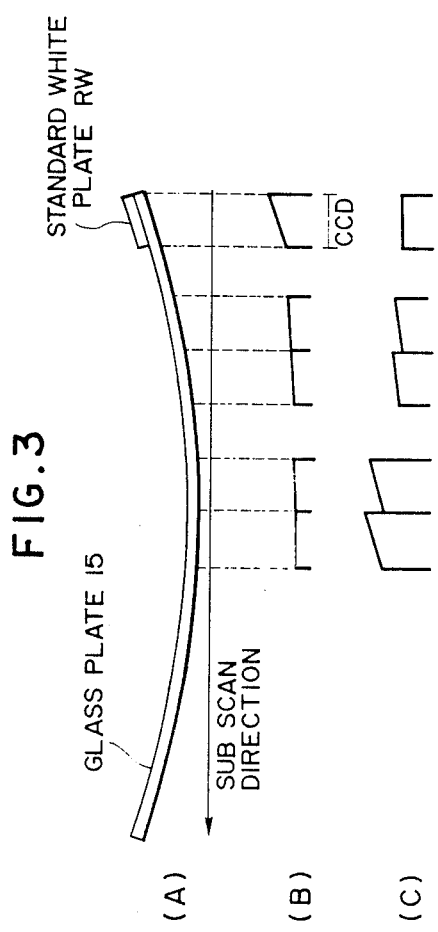

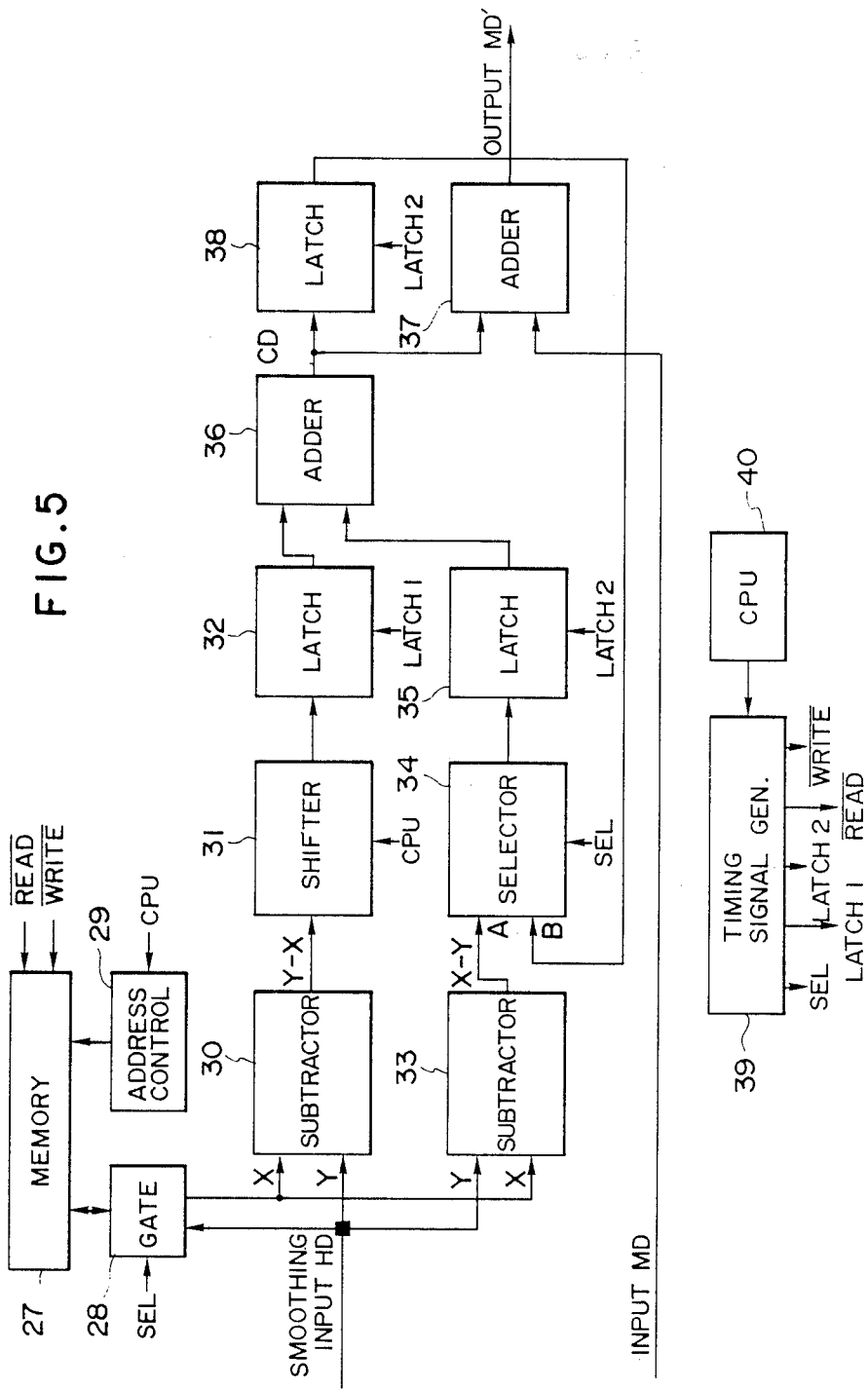

IMAGE READING APPARATUS

BACKGROUND OF THE INVENTION

1. Field of the Invention

The present invention relates to an image reading apparatus and, more particularly, to an image reading apparatus for reading an image while dividing the image into a plurality of areas.

2. Related Background Art

In an image reading apparatus used in a facsimile apparatus or a digital copying machine, a photoelectric conversion element such as a CCD is used. In this case, since sensitivity with respect to an input of an element is varied even among single elements depending on their positions due to the characteristics of the optical system and the conversion element, a correct image signal cannot be obtained. For this reason, a shading circuit is normally arranged to perform electrical correction so as to obtain apparently uniform sensitivity. More specifically, reference white and black data are read by the element, and a mathematical operation is performed so that these data become uniform data among pixels. Sampling of reference data for calculating a corrected value is performed by reading a standard white plate provided at a home position of an original table prior to reading of an original image. Thereafter, an actual original is read.

In order to read an original image having a size larger than an original size capable of being read by the photoelectric conversion element, the original image is divided into a plurality of stripe areas, and images are read in units of areas, as disclosed in U.S. patent application Ser. No. 798,672, and the like.

However, when a large-size original is input by scanning it in a plurality of lines, the following phenomenon is caused as the number of scanning lines is increased.

A mechanical displacement of an optical system due to flexure of an original table is increased as it is separated from the home position where shading data is sampled. Along with a lapse of time until a far area is scanned, a change over time in temperature of an input system is also increased.

Therefore, input sensitivity is changed from an initial state by the above-mentioned phenomenon, and correct shading is disturbed. More specifically, since the input sensitivity of a reading range tends to be slanted in one direction as compared to an initial state, a discontinuous offset appears at a boundary of the scanned areas, and a scanned image is different from an actual image. In this manner, since a boundary line having a discontinuous density appears on an image, degradation of image equality is conspicuous, resulting in a so-called shading error.

In order to avoid this, the following means are proposed.

(i) A reading area of an input element is widened, and an image is input without being divided.

(ii) Before the shading error occurs, shading data is re-sampled.

Of these means, the means (i) is a drastic countermeasure. However, it is very difficult to manufacture an element having a size capable of reading an A1-size original, resulting in high cost. Since the processing circuit becomes large in size accordingly, the means (i) is not a practical means.

On the other hand, the means (ii) does not have large difficulties in technique and cost. However, since sampling of shading data takes much time, a reading speed of the reading apparatus is decreased.

SUMMARY OF THE INVENTION

The present invention has been made in consideration of the above situation, and has as its object to provide an image reading apparatus capable of satisfactorily reading a large-size original image.

It is another object of the present invention to provide an image reading apparatus which has an arrangement in which an image is divided into a plurality of areas and images of the areas are read, and which can read images without causing a discontinuous density between adjacent areas.

It is still another object of the present invention to provide an image reading apparatus which has an arrangement in which an image is divided into a plurality of areas and images of the areas are read, and which can correct nonuniformity of a density level of adjacent areas without being influenced by image noise and the like.

The above and other objects and features of the present invention will be apparent from the following description.

BRIEF DESCRIPTION OF THE DRAWINGS

FIGS. 3 (A) to 3(C) are views showing a mechanism causing a shading error;

FIG. 4 is a block diagram of the image reading apparatus;

FIG. 5 is a block diagram showing an arrangement of a slant correction circuit of a shading error;

DETAILED DESCRIPTION OF THE PREFERRED EMBODIMENTS (First Embodiment)

Figure 1:
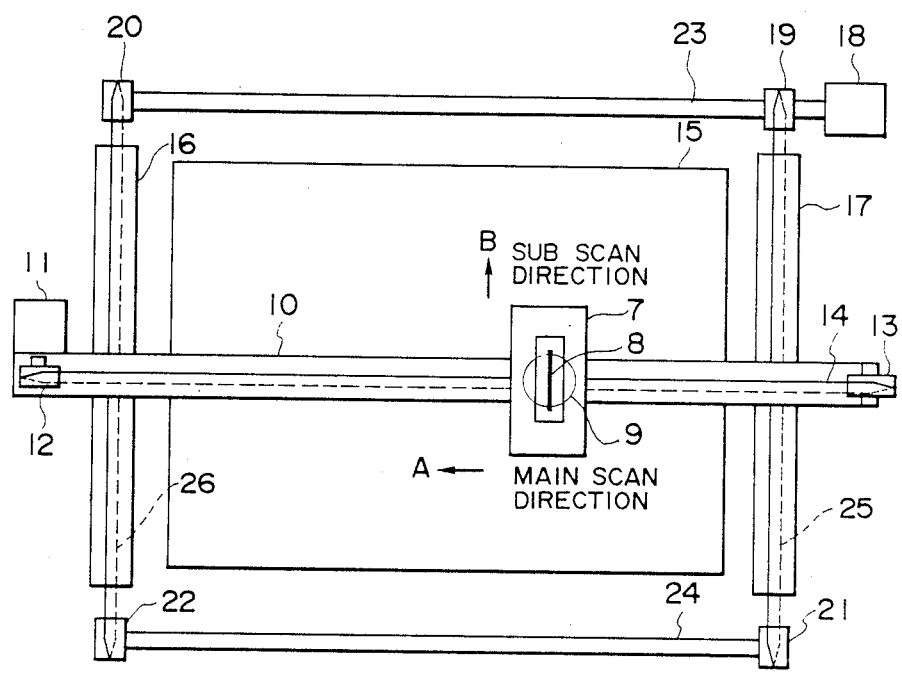
FIG. 1 is a plan view showing a mechanical arrangement of an image reading apparatus according to a first embodiment of the present invention.

FIG. 1 shows a mechanical arrangement of an image reading apparatus to which the present invention is applied.

A CCD unit 7 comprises a CCD 8 consisting of three one-dimensional line sensors (CCDs) $1r$, $1g$, and $1b$, a lens 9, and the like. The CCD unit 7 is moved along a rail 10 in a direction of an arrow A and a direction opposite thereto by a main scan drive system consisting of a main scan motor 11 fixed on the rail 10, pulleys 12 and 13, and a wire 14, and reads an image formed on an original placed on an original glass table 15 in a main scan direction when it is moved in the direction of the arrow A. The rail 10 is arranged on rails 16 and 17, and is moved in a direction of an arrow B and a direction opposite thereto by a subscan drive system consisting of a subscan motor 18, pulleys 19, 20, 21, and 22, shafts 23 and 24, and wires 25 and 26.

Figure 2:
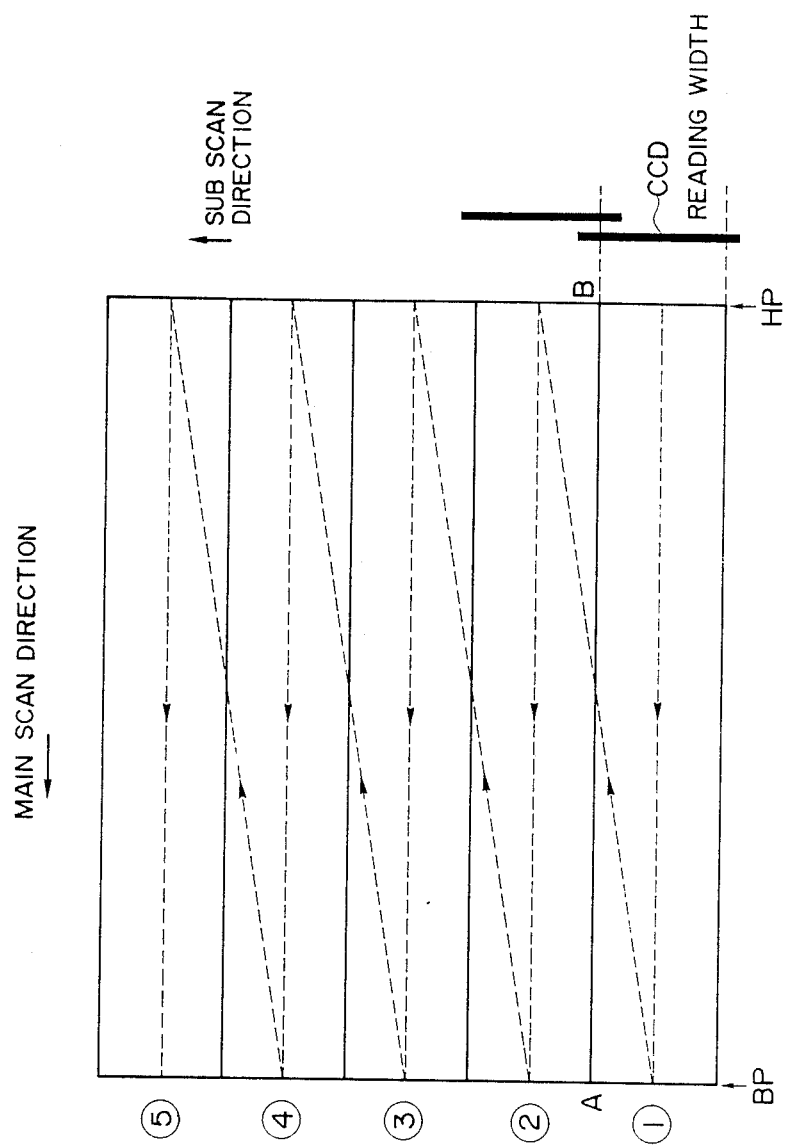
FIG. 2 is a chart showing an image reading operation.

FIG. 2 illustrates a scanning state of the CCD 8 when an original is read using the CCD unit 7. The CCD 8 is moved from a home position HP to a back position BP by one scan period in the main scan direction, and is then returned to the home position HP in the main scan direction so as to perform the next scanning, is moved in the subscan direction by a reading width of an image, thus starting the next scanning. It should be noted that the reading width of the CCD 8 is larger than an actual reading width. Therefore, a point on a line segment AB at a boundary between adjacent scan areas, e.g., scan ① and scan ② can be read out as image signals by the two scanning operations.

FIG. 3(A) shows a section of the original glass plate 15 and a shading correction output. FIG. 3(A) exaggaratively illustrates a flexure of the glass plate 15 for the purpose of easy understanding but not an actual flexure. In FIG. 3(A), various other displacements other than the flexure of the glass plate 15 are equivalently added to and expressed as the flexure of the glass plate 15. Due to the displacement, a required shading amount is varied depending on positions in the subscan direction. FIG. 3(B) shows a state wherein different shading operations are performed in the subscan direction. Therefore, when common shading correction of the entire subscan width is performed along the subscan direction on the basis of image data under a standard white plate RW, even if an original having a uniform density is read, output data cannot be uniform due to an offset from an ideal shading amount. For this reason, density nonuniformity in one scan period and steps at a boundary of scan areas are caused in the subscan direction, resulting in poor image quality. In particular, the latter density discontinuity at the boundary influences the image as a very noticeable noise component when read image data is output by an error diffusion method, or the like.

Reference figures show states wherein an actually input image is binarized and outputted by the error diffusion method. FIG. (a) shows a case wherein a shading error occurs, and FIG. (b) shows a case wherein shading data is slanted. FIG. (b) reveals conspicuous degradation in image equality as compared to FIG. (a).

FIG. 4 shows an electrical circuit arrangement of the image reading apparatus shown in FIG. 1. A light beam is converted to electrical signals $R_1$, $G_1$, and $B_1$ representing color components by the CCDs $1r$, $1g$, and $1b$. The electrical signals corresponding to the color components are converted to digital data $R_2$, $G_2$, and $B_2$ in units of pixels by A/D converters $2r$, $2g$, and $2b$. The sensitivity nonuniformity of the data $R_2$, $G_2$, and $B_2$ is corrected by a shading correction circuit 2, and these data are converted to corrected data $R_3$, $G_3$, and $B_3$. The data $R_3$, $G_3$, and $B_3$ are subjected to correction of spectral sensitivity of an optical filter by an input masking circuit 3. Signals $R_4$, $G_4$, and $B_4$ subjected to the above processing are input to a smoothing circuit 5 to reduce a noise component therefrom, and are input to a slant correction circuit 6 as shading error detection signals $R_5$, $G_5$, and $B_5$. On the other hand, the initial signals $R_4$, $G_4$, and $B_4$ which are not smoothed are also input to the slant correction circuit 6 and are subjected to shading error correction. Finally, image signals $R_6$, $G_6$, and $B_6$ in units of colors can be obtained.

The smoothing circuit 5 and the slant correction circuit 6 in the circuit shown in FIG. 4 remove a shading error in the subscan direction described with reference to FIGS. 3(A) to 3(C). The smoothing circuit 5 reduces a noise component included in the input signal, and performs appropriate weighting in a block of a predetermined unit, e.g., in a range of $3\times3$ pixels to output an average value. The slant correction circuit 6 uses the smoothed image data for detecting a slant of an offset caused by a shading error.

FIG. 5 shows an arrangement of the slant correction circuit 6. A memory 27 stores one-scanning image data in which a boundary portion of an immediately preceding scan period is smoothed. A gate 28 supplies data input from the smoothing circuit 5 at a timing corresponding to an end of a readout operation of the CCD 8, i.e., at which data at a boundary between scan areas of the present scan period and the next scan period is input, and supplies data from the memory 27 to a subtractor 30 at a timing corresponding to the start of a readout operation of the CCD 8, i.e., at which data at a boundary between scan areas of the immediately preceding scan period and the present scan period is input. An address control circuit 29 controls a write address of the memory 27.

The subtractor 30 subtracts data of the immediately preceding scan period read out from the memory 27 from data HD input from the smoothing circuit 5, thereby detecting a step at a boundary between adjacent subscan areas. A shifter 31 divides the detected step by a value corresponding to the number of readout pixels for one line of the CCD 8, thereby detecting a correction value between adjacent pixels. The detection result is kept stored while one-line data is read out from the CCD 8. On the other hand, a subtractor 33 subtracts the data HD in the present scan period input from the smoothing circuit 5 from boundary data in the immediately preceding scan period read out from the memory 27, thereby detecting a step at a boundary between adjacent subscan areas. An output from the subtractor 33 is added to an output from a latch 32 by an adder 36, thus calculating correction data CD. The correction data CD is added to image data MD from the input masking circuit 4 by an adder 37 so as to perform correction. In this case, the correction data CD stored in the latch 38 is again added to the output from the latch 32 through a selector 34 and a latch 35, and serves as correction data for the next pixel. More specifically, the content stored in the latch 32 is equal to a change in correction value for each pixel.

In this circuit arrangement, the change in correction value is fixed to be a power of 2. However, when the number of readout pixels of the CCD 8 does not correspond to the power of 2, a latch signal LATCH2 can be supplied at an appropriate timing to cope with an arbitrary reading width. For this purpose, a timing signal generator 39 generates various signals including LATCH1 and LATCH2 at timings designated by a CPU 40. The CPU 40 also gets a shift amount of the shifter 31, and initial data of the address control circuit 29.

FIG. 5 shows an arrangement for only one of the R, G, and B color signals. This circuit may be arranged for each color or the latches 32 and 35 may be arranged for each color to time-divisionally process serial data.

In FIG. 4, the slant correction circuit 6 is connected to the output of the input masking circuit 4. However, the slant correction circuit 6 may be connected to another portion for performing multi-value data processing at the output side of the shading circuit.

Figure 6:
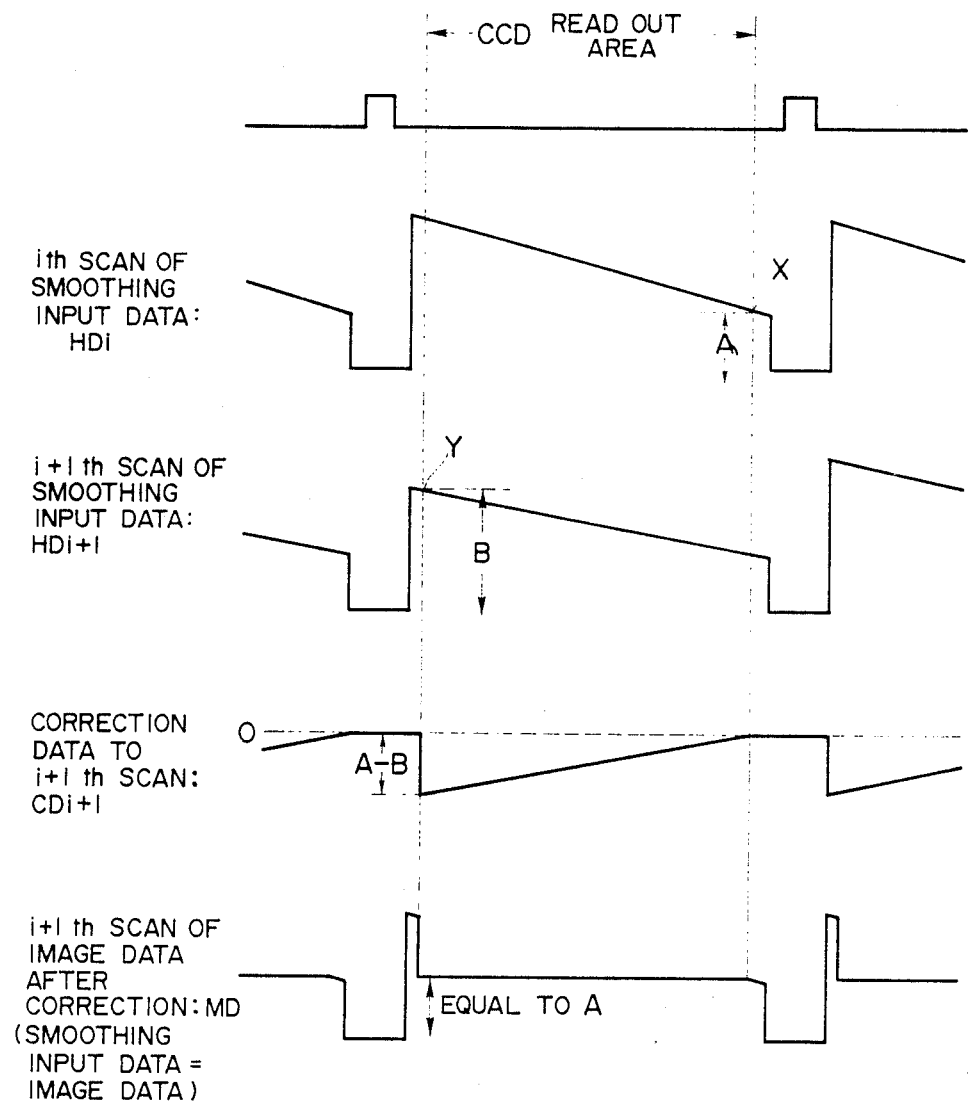
FIG. 6 is a chart showing an operation of the slant correction circuit.

FIG. 6 shows the input HD from the smoothing circuit 5 to the slant correction circuit 6, the slant correction data CD, and output data MD' as a sum of data HD and CD. A sync signal HS is used for reading out one-line data from the CCD 8. Assume that a point X at the end of an ith-scan CCD readout area and a point Y at the beginning of an (i+1)th-scan CCD readout area are image data corresponding to an identical point on an original. These image data are generated since a subscan progresses by the length of the CCD readout area every time a main scan ends.

Correction data $CD_{i+1}$ for the (i+1)th scan is equal to data obtained by subtracting Y-point data B of smoothing input data $HD_1$ in the (i+1)th scan from X-point data A of smoothing input data $HD_1$ in the ith scan. Thereafter, as the one-line readout operation of the CCD 8 progresses, the correction amount is linearly converged to 0, and becomes 0 at the rear end of the readout area. The correction data $CD_{i+1}$ is added to the image data MD to remove a slant of image data and a step of a boundary region caused by a shading error. In FIG. 6, the image data MD is assumed to be equal to the smoothing input data HD for the sake of descriptive simplicity. According to the circuit arrangement shown in FIG. 5, the correction operation shown in FIG. 6 can be performed in real time in synchronism with the data readout operation of the CCD 8.

Figure 7:
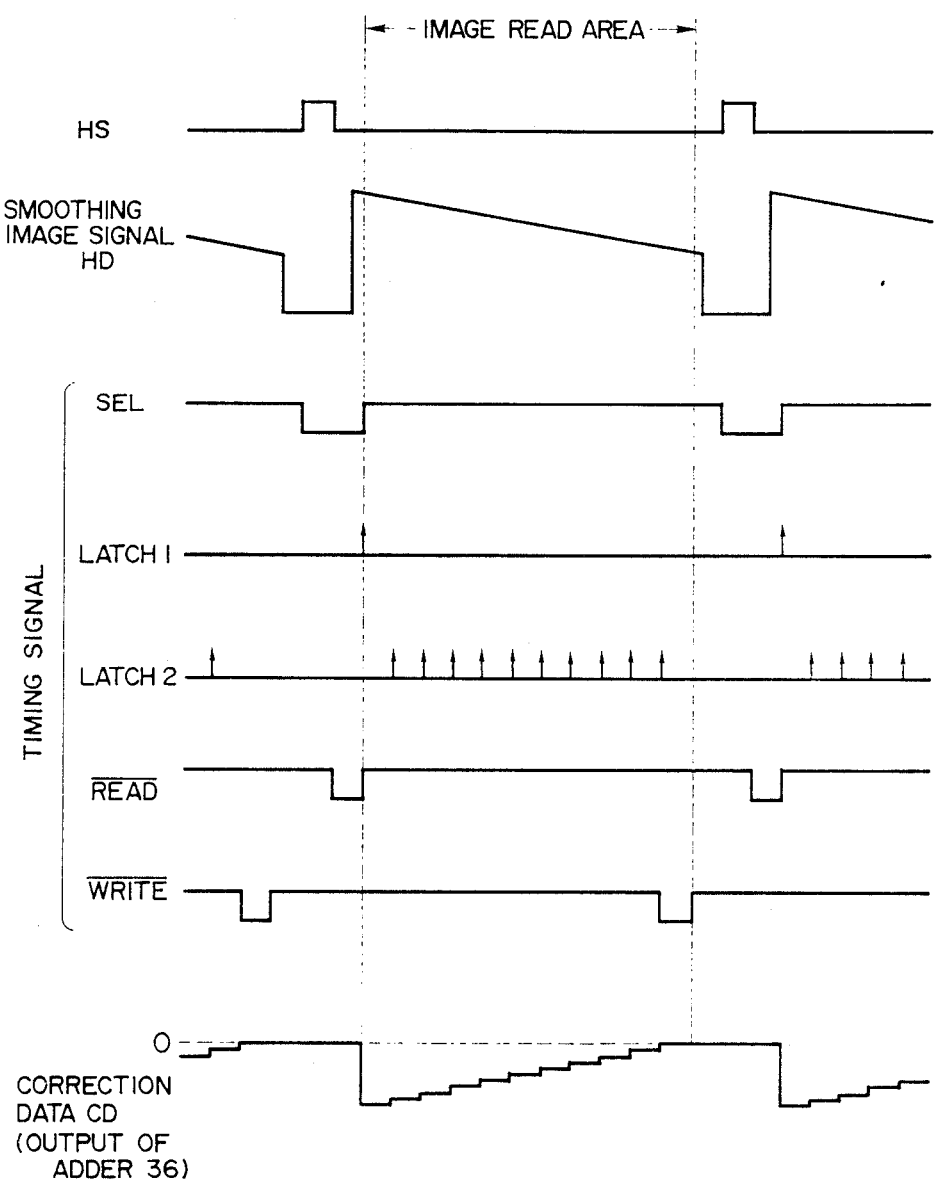
FIG. 7 is a chart showing timing signals generated by a timing signal generator.

FIG. 7 shows states of timing signals supplied from the timing generator 39 to the circuit portions shown in FIG. 5. When a signal SEL is at LOW level, the gate 28 is enabled to write the data HD in the memory 27, and when the signal SEL is at HIGH level, the gate 28 is enabled to read out the data HD from the memory 27. When the signal SEL is at LOW level, the selector 34 selects an input A from the subtractor 33, and when the signal SEL is at HIGH level, the selector 34 selects an input B from the latch 38. The latches 32, 35, and 38 perform latch operations in response to the latch signals LATCH1 and LATCH2, and a latch signal LATCH3. The correction data CD is changed by the content held in the latch 32 in response to the signal LATCH2. Therefore, when the timing of the signal LATCH2 is changed, a change point of the correction data can be desirably changed, and an indefinite reading width such as enlargement or reduction can be coped with. The CPU 40 sets the timings. Signals $\overline{\text{READ}}$ and $\overline{\text{WRITE}}$ respectively represent read and write timings of the memory 27.

As described above, image data subjected to correction of a level step at a boundary between adjacent subscan areas and a level step between adjacent pixels caused by a shading error can be obtained. Therefore, a reproduced image can be prevented from causing a change in density level and a step at the boundary.

(Second Embodiment)

Figure 8:
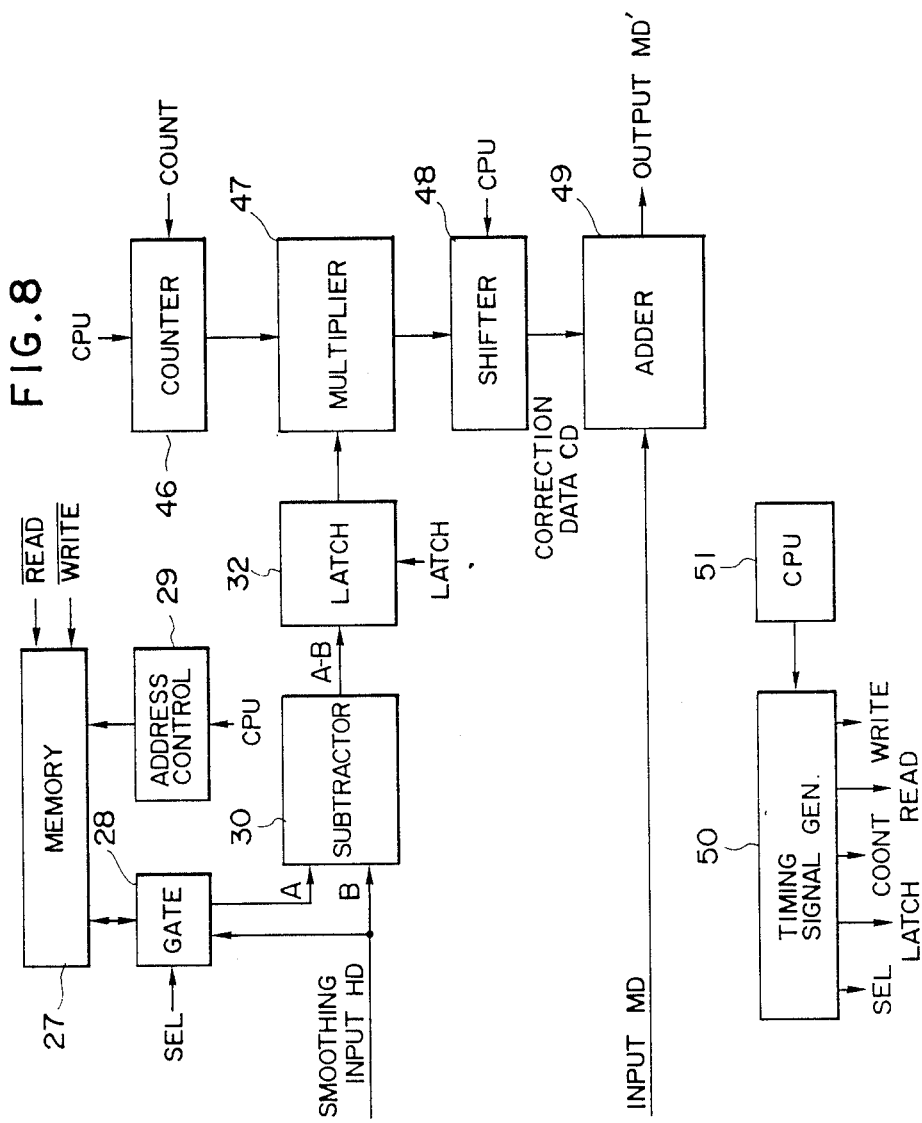
FIG. 8 is a block diagram showing an arrangement of a slant correction circuit according to a second embodiment of the present invention.

FIG. 8 shows another embodiment of the slant correction circuit 6 having another circuit arrangement. A memory 27, a gate 28, an address control circuit 29, a subtractor 30, and a latch 32 calculate a difference of data between an immediately preceding scan and a present scan on a boundary line of main scan as in the circuit arrangement shown in FIG. 5. The difference is multiplied with a content of a counter 46 by a multiplier 47, and the product is divided by a shifter 48 to match places, thus obtaining correction data CD. The correction data CD and input data MD are added to each other by an adder 49 to perform correction. The counter 46 initially sets the number of readout pixels of the CCD therein, and counts down so that the content becomes 0 at the end of the readout operation of the CCD, thereby updating correction data in units of pixels.

Figure 9:
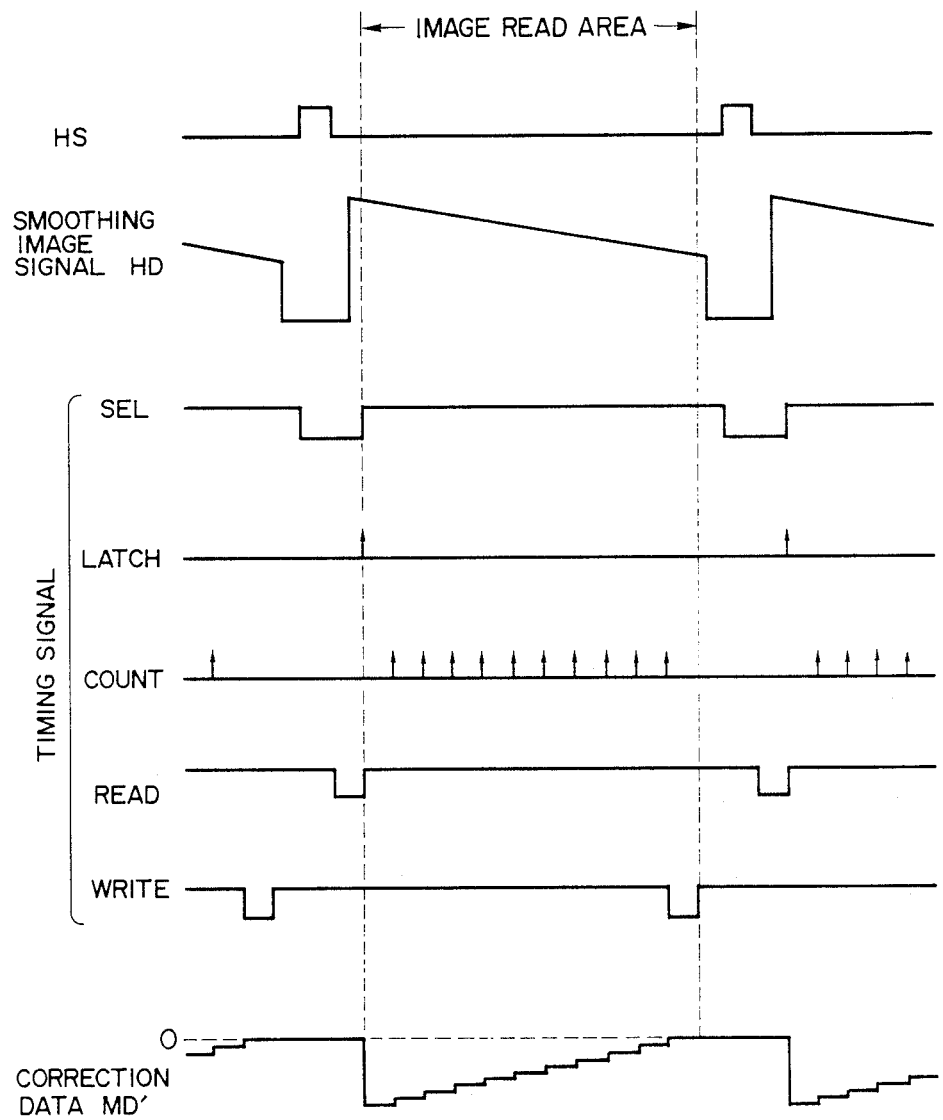
FIG. 9 is a chart showing timing signals generated by a timing signal generator shown in FIG. 8.

The circuit shown in FIG. 8 may be arranged for each of three colors, i.e., R, G, and B, or the latch 32 may be arranged for each color to process serial inputs of R, G, and B. FIG. 9 shows various timing signals which are set by a CPU 51 and are generated by a timing signal generator 50. The CPU 51 sets an initial value of the address control circuit 29, an initial value of the counter 46, and a shift amount of the shifter 48 in addition to setting of the timings.

When a select signal SEL is at LOW level, the gate 28 transfers data HD from the smoothing circuit 5 to the memory 27, and when it is HIGH level, transfers data from the memory 27 to the subtractor 30. When the latch 32 receives a signal LATCH, it latches the output result from the subtractor 30. The counter 46 performs a count operation in synchronism with a signal COUNT.

(Third Embodiment)

Figure 10:
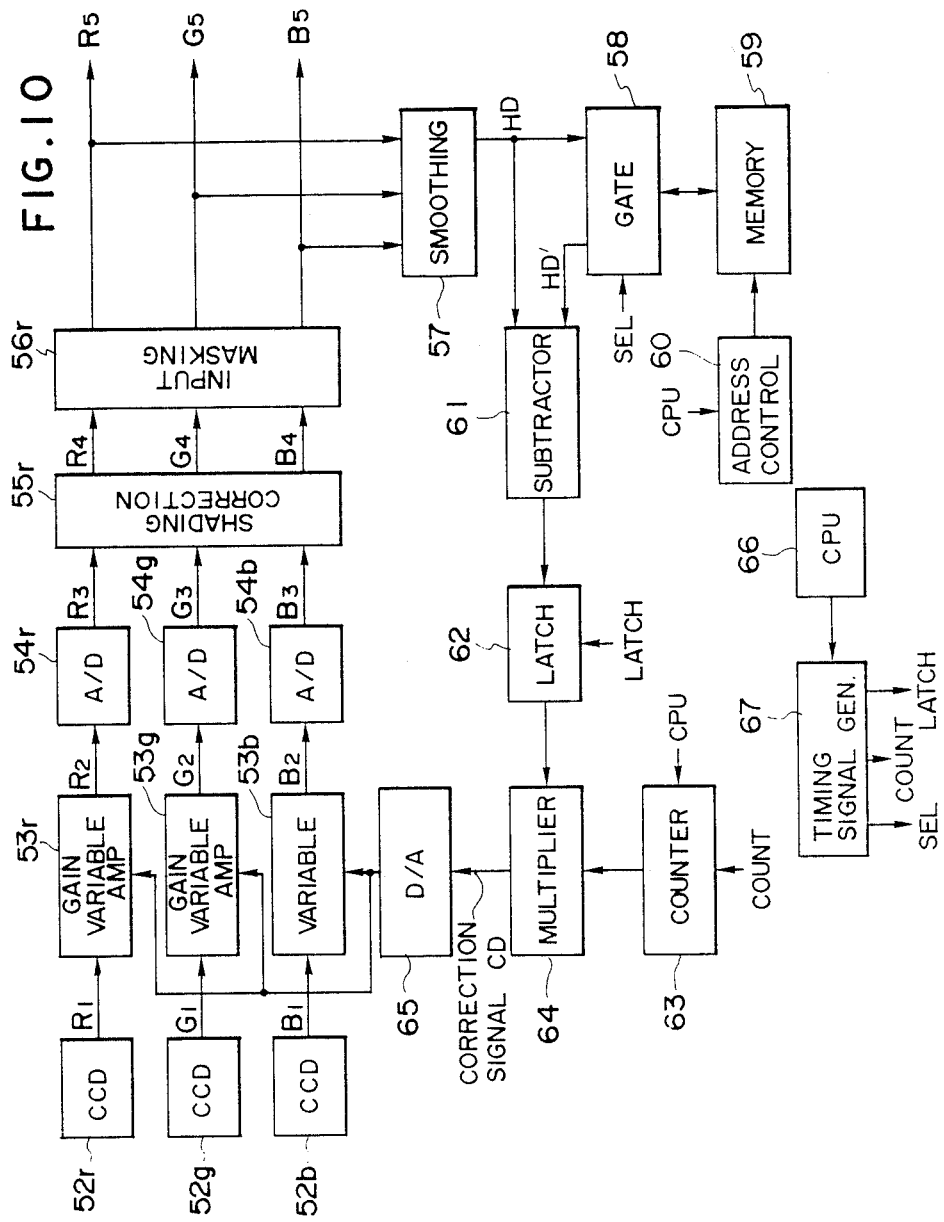
FIG. 10 is a block diagram of a circuit of an image reading apparatus according to a third embodiment of the present invention.

FIG. 10 shows an arrangement of an electrical circuit of an image reading apparatus having another arrangement. Electrical signals $R_1$, $G_1$, and $B_1$ of images in units of colors read by CCDs 52r, 52g, and 52b are appropriately amplified or attenuated by gain variable amplifiers 53r, 53g, and 53b, and are then converted to digital signals R3, G3, and B3 by A/D converters 54r, 54g, and 54b. Signals $R_4$, $G_4$, and $B_4$ which are subjected to correction of nonuniformity due to photoelectric conversion by the CCDs by a shading correction circuit 55 are subjected to correction of spectral sensitivity of the CCDs by an input masking circuit 56 and are output as signals $R_5$, $G_5$, and $B_5$.

The obtained signals $R_5$, $G_5$, and $B_5$ are input to a smoothing circuit 57 so that noise components are reduced therefrom. Signals at the rear end of a CCD read area are then stored in a memory 59 through a gate 58, and signals at the front end of the read area are input to a subtractor 61 from the smoothing circuit 57. The subtractor 61 calculates a difference between a signal HD at the front end of the readout area as an output from the smoothing circuit and a signal HD' at the rear end of the readout area stored during the immediately preceding scan, which is read out from the memory 59, and stores the difference in a latch 62.

The stored value is multiplied with a content of a counter 63 by a multiplier 64, thus calculating a slant correction signal CD. The signal CD is converted to an analog signal by a D/A converter 65, and is input to the gain variable amplifiers 53r, 53g, and 53b as gain control signals. Thus, amplification factors of the outputs from the CCDs 52r, 52g, and 52b are corrected, thus performing slant correction of image data caused by a shading error.

Along with the readout operation of the CCD, the correction data is updated by counting down or up the content of the counter 63. The address control circuit 60 controls a read/write address of the memory 59. A timing signal generator 67 repetitively generates various signals at timings set by a CPU 66. The CPU 66 also sets an initial value of the counter 63, the initial value of the address control circuit 60, and the like.

In this embodiment, the timing signals are generated by the timing signal generator 67 in the same manner as in the second embodiment shown in FIG. 9, and cause the same operation.

In FIG. 10, identical shading slant correction is performed for three colors, i.e., R, G, and B. Of course, correction may be independently performed by arranging independent circuits in units of colors.

In the first and second embodiments, correction data is added to image data to approximately correct a shading error. In this embodiment, image data and correction data are multiplied with each other by gain variable amplifiers, so that correction can be performed without performing approximation.

(Fourth Embodiment)

Figure 11:
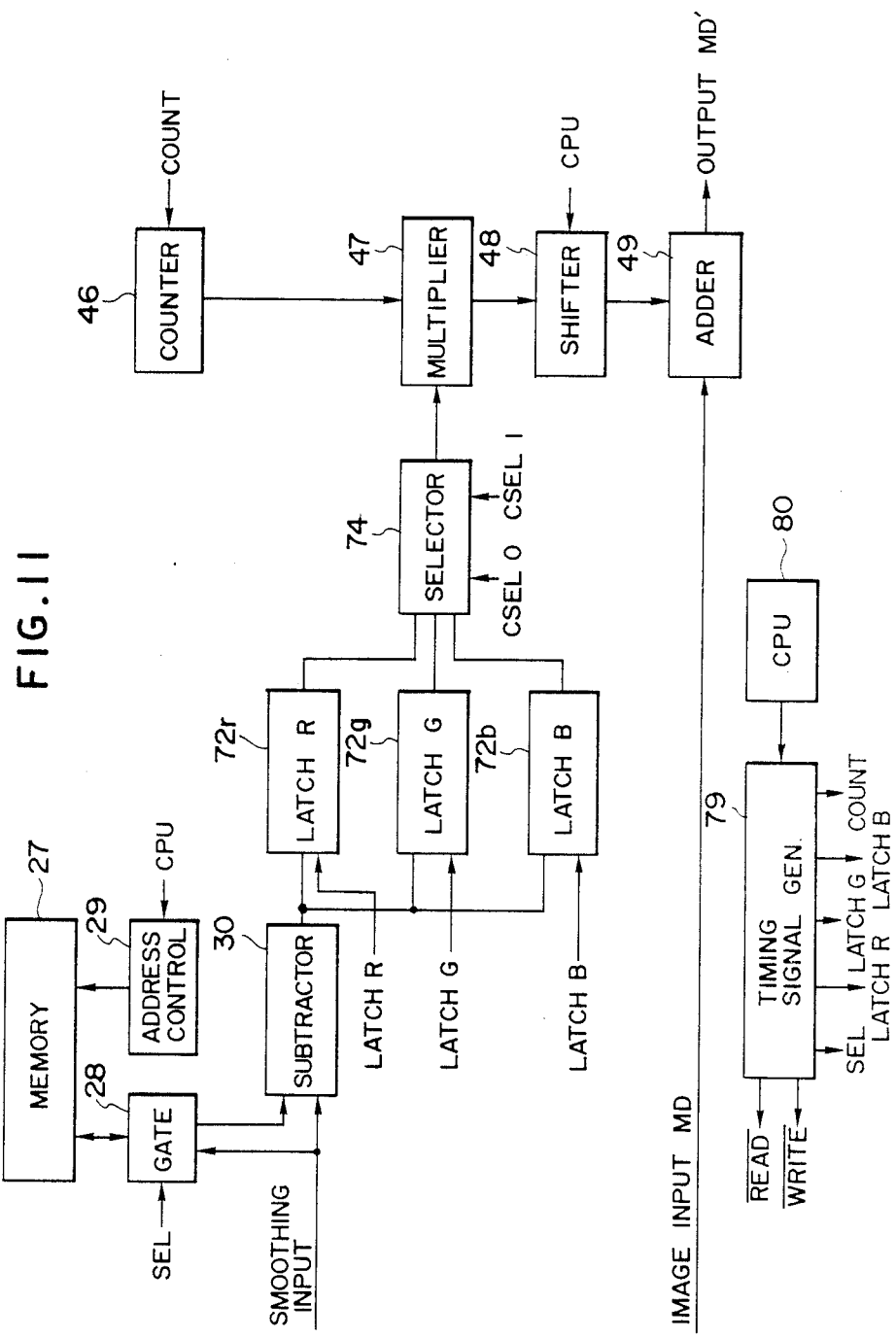
FIG. 11 is a block diagram showing an arrangement of a slant correction circuit according to a fourth embodiment of the present invention.
Figure 12:
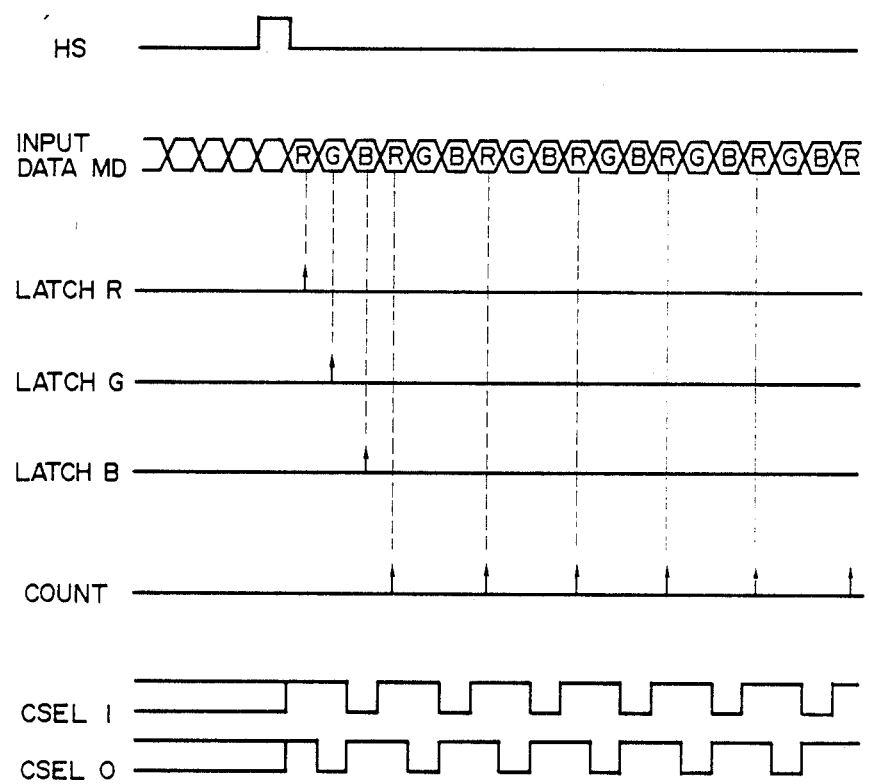
FIG. 12 is a chart showing timings of the circuit shown in FIG. 11.

FIG. 11 shows the slant correction circuit 6 of the second embodiment shown in FIG. 8, which can cope with serial inputs of three color, i.e., R, G, and B data. A difference from FIG. 8 is that a latch for latching the output from the subtractor 30 is arranged for each of R, G, and B colors, a selector 73 is provided for switching the outputs from these latches 72r, 72g, and 72b, and a timing signal generator 79 is modified to generate timing signals LATCHR, LATCHG, and LATCHB. Color select signals CSEL0 and CSEL1 provided to the selector 73 may be generated by the timing signal generator 79 or may be supplied from a circuit outside the slant correction circuit 6. When both the signals CSEL1 and CSEL0 are at HIGH level, the selector 74 selects the latch R; when the signal CSEL1 is at HIGH level and the signal CSEL0 is at LOW level, the latch G is selected; and when the signal CSEL1 is at LOW level and the signal CSEL0 is at HIGH level, the latch B is selected. FIG. 12 shows these timing signals.

As can be understood from this embodiment, when slant correction processing is performed for serial data, the latches 72r, 72g, and 72b and the selector 74 need only be added, and other circuit components can be used without modification. This embodiment is particularly effective when R, G, and B signals are serially read out from the CCD, as in the case wherein a color sensor in which R, G, and B filters are cyclically and linearly arranged on a plurality of light-receiving elements is used. Not only for the second embodiment, but also for the first and third embodiments, a circuit arrangement designed for serial data is available.

According to the arrangement of this embodiment as described above, in an image reading apparatus in which an input image is divided into a plurality of areas and the image areas are read, a slant component of image data caused by a shading error is corrected, so that a discontinuous change at a boundary between adjacent scan periods of image areas can be removed without performing data sampling for shading several times, thus improving image quality. In this embodiment, full-color image reading has been exemplified.

However, the present invention can also be applied to apparatuses which perform monochromatic image reading or multi-color (two or three colors) reading.

As described above, when an image to be read is divided into a plurality of areas and images corresponding to divided areas are read, a discontinuous component of image data at a boundary portion of the plurality of reading areas is detected, data for correcting discontinuity of image data is calculated in accordance with the detected discontinuous component, and the discontinuous component at the boundary portion is removed on the basis of the correction data and the read original image data. Therefore, a variation or step in image data caused by a shading error can be efficiently removed, and good image data can be obtained.

(Fifth Embodiment)

Figure 13:
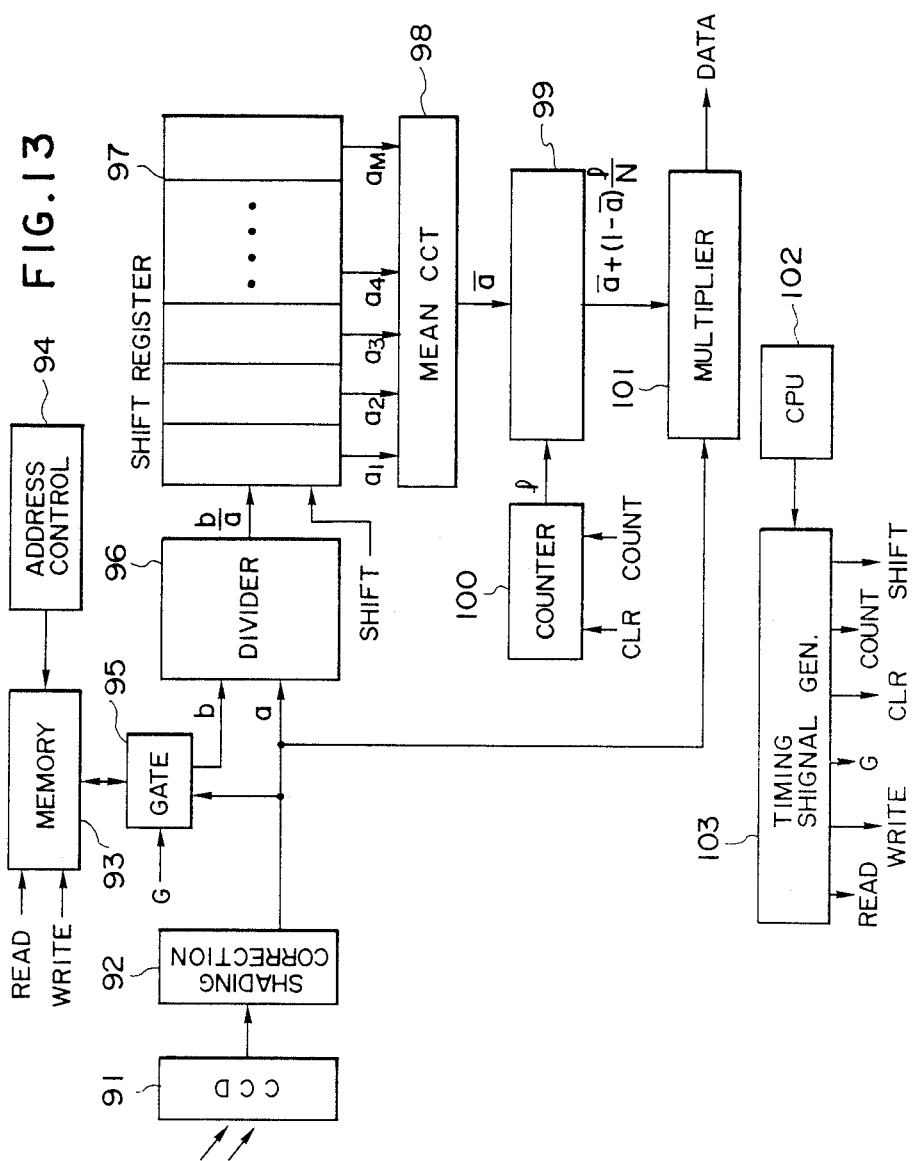
FIG. 13 is a block diagram of an image processor according to a fifth embodiment of the present invention.

FIG. 13 is a block diagram of a processor for processing an output from the image reading apparatus shown in FIG. 1. In FIG. 13, the processor comprises a CCD 91 (corresponding to the CCD 8 shown in FIG. 1) for reading an original, a shading circuit 92 for performing sensitivity correction of the CCD 91, a memory 93 for storing boundary data for one scan period, an address control circuit 94 for controlling a memory access, a gate 95 for switching an input/output to/from the memory 93, a divider 96, shift registers 97, a mean circuit 98, a counter 100 for counting clocks COUNT corresponding to pixels of input image data, an arithmetic circuit 99 for performing an arithmetic operation based on data from the mean circuit 98 and the counter 100 to obtain a correction coefficient, a multiplier 101 for multiplying image data with the correction coefficient, a control CPU 102, and a timing signal generator 103 for generating signals supplied to respective portions.

In the above arrangement, light reflected by an original is converted to digital signals corresponding to the intensity of light by the CCD 91, and the digital signals are subjected to sensitivity correction by the shading circuit 92.

An image is read in units of stripes as described above, and image data corresponding to the rear end of an image area and output from the shading circuit 92 is written in the memory 93 through the gate 95. On the other hand, when image data corresponding to the front end of the image area is input, image data corresponding to the rear end of the immediately preceding scan area is read out from the memory 93 through the gate 95, and a ratio of these data is calculated by the divider 96. The calculated ratio (quotient) is sequentially stored in the M serial shift registers 97. Thus, the quotients corresponding to successive M columns of the CCD 91 are stored in the shift registers 97. M data readout from the shift registers 97 are averaged by the mean circuit 98. The calculated average value $\bar{a}$ is subjected to an arithmetic operation of $\bar{a}+(1-\bar{a})(1/N)$ using the content of the counter 100 by the arithmetic circuit 99, and the arithmetic result as the correction coefficient is multiplied with image data by the multiplier 101, thus performing correction.

Figure 14:
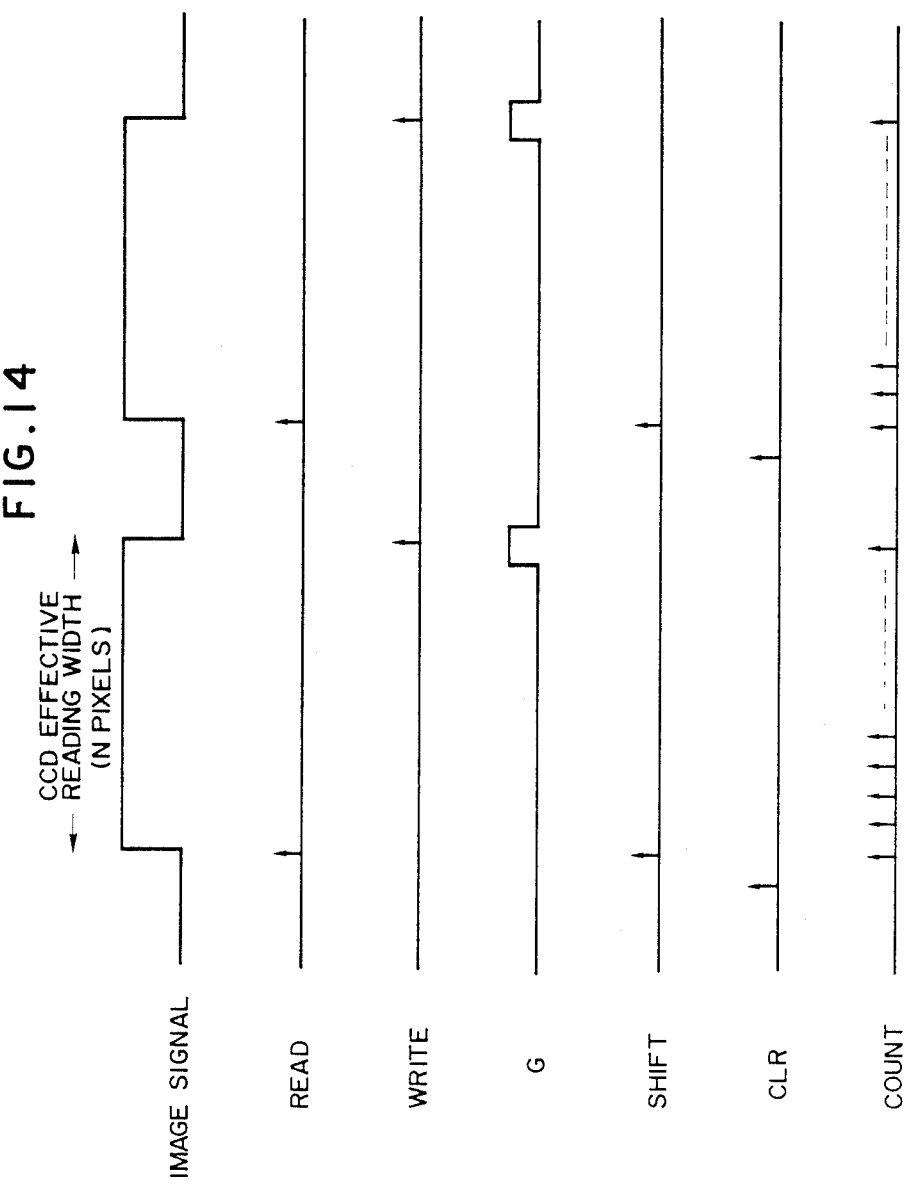
FIG. 14 is a timing chart of the circuit shown in FIG. 13.

FIG. 14 shows states of timing signals supplied to the respective circuit portions shown in FIG. 13. Assume that input data corresponding to an effective reading width (one line) of the CCD consists of N pixels. A signal READ is supplied to the memory 93 at the beginning of the read operation, and a ratio of data readout from the memory 93 at this time to the presently input image data is calculated by the divider 96. The ratio represents a ratio of a step in image data in the immediately preceding scan and image data corresponding to the same pixels in the present scan. This ratio is latched and shifted in the corresponding shift register 97. If data of a kth clock of a jth column in an ith area is given by $X_{i,j,k}$, the ratios stored in the shift registers 97 during reading of the ith area are given by from the left side of FIG. 13:

$$\frac{X_{i-1,k,N+1}}{X_{i,k,0}}, \frac{X_{i-1,k-1,N+1}}{X_{i,k-1,0}}, \frac{X_{i-1,k-2,N+1}}{X_{i,k-2,0}},$$

Averaging of the M data stored in the shift registers 97 in the mean circuit 98 is equivalent to averaging of successive M pixels along the boundary line of the image areas. If this value is $\bar{a}$ and the output from the counter 100 is l, the arithmetic circuit 99 outputs a correction coefficient given by $\bar{a}+(1-\bar{a})(l/N)$. The correction coefficient linearly changes from $\bar{a}$ to 1 as the output l from the counter 100 changes from 0 to N. Therefore, image data DATA output from the multiplier 101 is given by:

$$X_{i,j,k} \cdot (\bar{a}+(1-\bar{a})(k/N))$$

At the front end of the CCD 91, correction is performed so that the value at the front end coincides with the value at the rear end of the immediately preceding scan area. Thereafter, correction is performed using the correction coefficient which changes according to pixel positions. At the rear end, no correction is performed.

In this embodiment, a single-color processing system has been exemplified for the sake of descriptive convenience. However, when CCD line sensors having R, G, and B color filters are arranged in a CCD unit and R, G, and B signals are time-serially input, the number of the shift registers 97 shown in FIG. 13 is increased in correspondence with three colors, and a selector is added to perform time-serial processing. When R, G, and B signals are input in parallel, necessary portions need only be arranged as parallel circuits, and the present invention is not limited to single-color processing.

Thus, discontinuity of image data at a boundary between adjacent reading areas can be removed. For example, when an image is printed on the basis of read data, an error such as formation of stripe-like density nonuniformity in the print-out image can be prevented.

As described above, since a reading element has a variation component having a given width as a noise component due to its characteristics, if a discontinuous component is calculated in units of pixels, a correct correction value cannot often be obtained due to the influence of the noise component. According to this embodiment, however, since a discontinuous component at the boundary of images is very smoothly changed along a direction of the boundary line, a means for linearly smoothing the discontinuous component is arranged at the output side of a means for extracting the discontinuous component along the boundary line, so that the influence of the noise component between adjacent components is removed to perform boundary processing.

When an edge component whose density is abruptly changed is present adjacent to the boundary line, a problem of the influence upon detection of the discontinuous component can be removed, and discontinuity can be satisfactorily removed.

(Sixth Embodiment)

Figure 15:
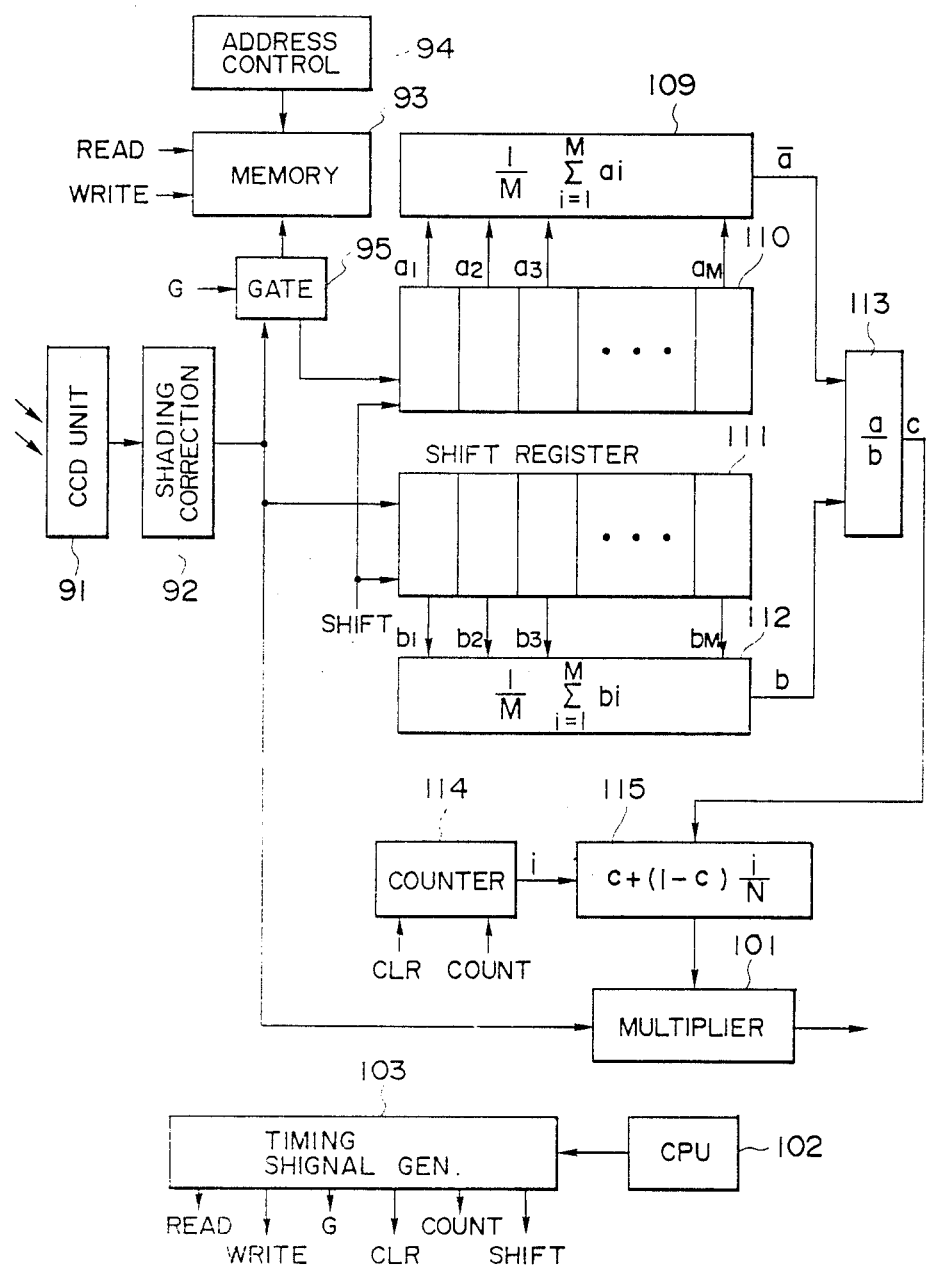
FIG. 15 is a block diagram of an image processor according to a sixth embodiment of the present invention.

FIG. 15 shows another arrangement of the processor. In FIG. 15, blocks denoted by the same reference numerals have the same functions as in FIG. 13. A difference from the arrangement shown in FIG. 13 is that shift registers 110 and 111 for storing data before division are arranged, and after mean values of data stored in these registers are calculated by arithmetic units 109 and 112, a ratio is calculated by a divider 113. Note that the timing signals are the same as those in FIG. 14.

The embodiment shown in FIG. 15 is characterized in that even if an input image is slightly offset along the boundary, an error from a desirable correction value can be minimized.

In the above embodiment, a ratio of discontinuity at a boundary is calculated, and correction is performed based on the calculated ratio. Alternatively, a discontinuity amount is calculated, and image data is subjected to addition/subtraction on the basis of the calculated amount to perform correction.

The number of successive pixels to be smoothed is appropriately selected in accordance with a reading density of an image.

As described above, since a density discontinuity component on an image boundary line is smoothed along a boundary, a noise component can be removed and a density difference at a boundary can also be removed without being influenced by adjacent pixels.

Some preferred embodiments of the present invention have been described. However, the present invention is not limited to arrangements described in these embodiments, and various changes and modifications may be made within the spirit and scope of the appended claims.

What is claimed is:

1. An image reading apparatus comprising:
   reading means for reading an image line by line and outputting image data;
   first moving means for repeatedly moving a reading position of said reading means in a main scanning direction a plurality of times;
   second moving means for moving the reading position of said reading means in a subscanning direction every time the reading position of said reading means is moved in the main scanning direction;
   detection means for detecting a difference between image data outputted from said reading means during a preceding movement of the reading position in the main scanning direction and image data outputted from said reading means during a current movement of the reading position in the main scanning direction; and
   correction means for correcting the image data outputted from said reading means based on the difference detected by said detection means.

2. An apparatus according to claim 1, wherein said reading means comprises a linear image sensor for reading the image.

3. An apparatus according to claim 1, wherein said detection means detects a difference of image data in a boundary portion of an image area read by said reading means during the preceding movement and image data in a boundary portion of an image read by said reading means during the current movement.

4. An apparatus according to claim 1, further comprising storage means for storing image data outputted from said reading means during the preceding movement.

5. An apparatus according to claim 1, wherein said correction means performs a correction processing so as to provide alignment of a level of the image data outputted from said reading means during the preceding movement and a level of the image data outputted from said reading means during the current movement.

6. An apparatus according to claim 1, wherein said detection means detects a ratio of a level of the image data outputted from said reading means during the preceding movement and a level of the image data outputted from said reading means during the current movement.

7. An image reading apparatus comprising:
reading means for reading an image line by line and outputting image data;
first moving means for repeatedly moving a reading position of said reading means in a main scanning direction a plurality of times;
second moving means for moving the reading position of said reading means in a subscanning direction every time the reading position of said reading means is moved in the main scanning direction;
storage means for storing image data outputted from said reading means during a preceding movement of the reading position in the main scanning direction; and
correction means for correcting image data outputted from said reading means during a current movement of the reading position in the main scanning direction based on the image data stored in said storage means.

8. An apparatus according to claim 7, wherein said reading means comprises a linear image sensor for reading the image.

9. An apparatus according to claim 7, further comprising detection means for detecting a difference between image data stored in said storage means and image data outputted from said reading means during the current movement.

10. An apparatus according to claim 9, wherein said correction means performs a correction processing based on the difference detected by said detection means.

11. An apparatus according to claim 9, wherein said detection means detects a ratio of a level of the image data stored in said storage means and a level of the image data outputted from said reading means during the current movement.

12. An apparatus according to claim 7, wherein said storage means stores image data of a boundary portion of an image area read by said reading means during the preceding movement and image data of a boundary portion of an image area read by said reading means during the current movement.

13. An apparatus according to claim 7, wherein said correction means performs a correction processing so as to provide alignment of a level of the image data outputted from said reading means during the preceding movement and a level of the image data outputted from said reading means during the current movement.

14. An image reading apparatus comprising:
reading means for reading an image line by line and outputting image data;
first moving means for repeatedly moving a reading position of said reading means in a main scanning direction a plurality of times;
second moving means for moving the reading position of said reading means in a subscanning direction every time the reading position of said reading means is moved in the main scanning direction;
correction means for correcting a level of image data outputted from said reading means; and
control means for controlling a correction processing of said correction means, said control means controlling the correction processing to be provided for image data outputted from said reading means during a current movement of the reading position in the main scanning direction, based on image data outputted from said reading means during a preceding movement of the reading position in the main scanning direction.

15. An apparatus according to claim 14, wherein said reading means comprises a linear image sensor for reading the image.

16. An apparatus according to claim 14, further comprising storage means for storing image data outputted from said reading means during the preceding movement.

17. An apparatus according to claim 14, wherein said control means controls the correction processing so as to provide alignment of a level of the image data outputted from said reading means during the preceding movement and a level of the image data outputted from said reading means during the current movement.

18. An apparatus according to claim 14, wherein said control means controls the operation processing based on a difference between the image data outputted from said reading means during the preceding movement and the image data outputted from said reading means during the current movement.

* * * * *

UNITED STATES PATENT AND TRADEMARK OFFICE
CERTIFICATE OF CORRECTION

PATENT NO. : 4,954,913
DATED : September 4, 1990
INVENTOR(S) : Koji Kajita

It is certified that error appears in the above-identified patent and that said Letters Patent is hereby corrected as shown below: Title page;

[56] References Cited:

Under "U.S. PATENT DOCUMENTS",

"3,976,982  8/1976  Eiselem.......... 358/453"
should read
--3,976,982  8/1976  Eiselen......... 358/453--.

FIG. 15 (SHEET 14):

Box 103, "SHIGNAL" should read --SIGNAL--.

Signed and Sealed this

Twenty-first Day of July, 1992

Attest:

DOUGLAS B. COMER

Attesting Officer

Acting Commissioner of Patents and Trademarks